T. D. McDONALD.
COUPLING FOR HAY RACKS.
APPLICATION FILED MAR. 27, 1916.
1,207,955.
Patented Dec. 12, 1916.
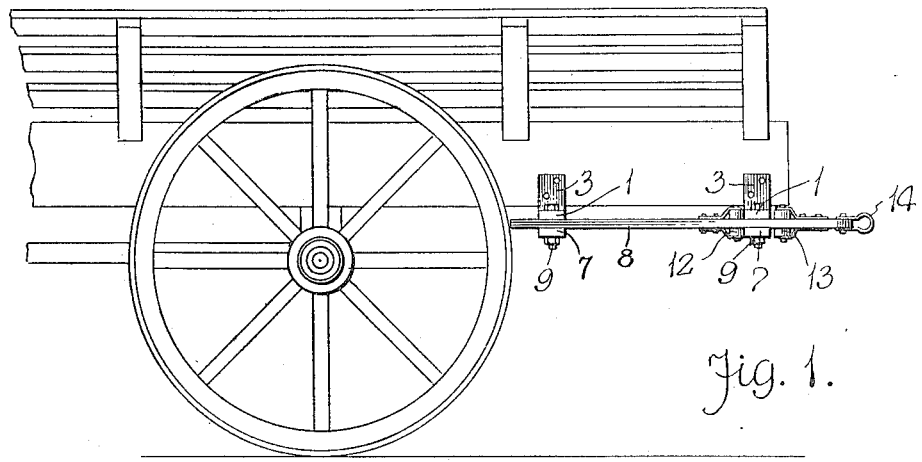
Fig. 1.
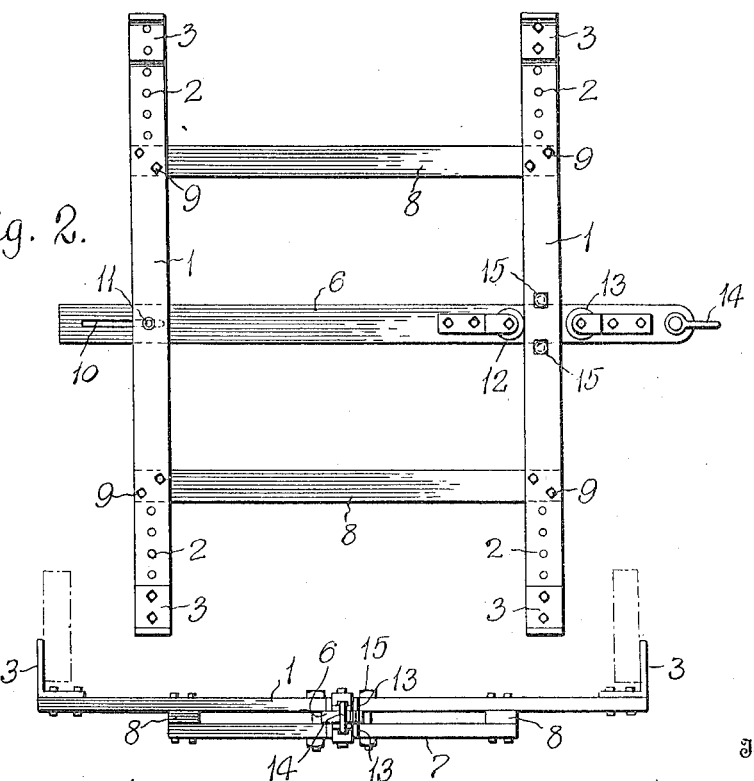
Fig. 2.
Fig. 3.
Witnesses
Chas. W. Stauffiger
Anna M. Dorr
Inventor
Thorburn D. McDonald,
By Paschal & Paschal
Attorneys

UNITED STATES PATENT OFFICE.

THORBURN D. McDONALD, OF RUTHVEN, ONTARIO, CANADA.

COUPLING FOR HAY-RACKS.

1,207,955.

Specification of Letters Patent.

Patented Dec. 12, 1916.

Application filed March 27, 1916. Serial No. 86,914.

*To all whom it may concern:*

Be it known that I, THORBURN D. McDONALD, a subject of the King of England, residing at Ruthven, in the county of Essex and Province of Ontario, Dominion of Canada, have invented certain new and useful Improvements in Couplings for Hay-Racks, of which the following is a specification, reference being had therein to the accompanying drawings.

In the operation of hay loaders and the like, which are usually drawn behind hay racks, it is necessary that a coupling be provided which will keep the hay rack and loader substantially in line in such a way that one will not interfere with the operation of the other, and in such way that the strain is suitably taken care of.

This invention relates to a coupling for attaching a hay loader or the like to a hay rack or other vehicle and an arrangement of parts whereby the loader is made to track closely behind the vehicle, and whereby the coupling is available for use on racks of different widths and the like.

The invention consists in the matters hereinafter set forth and more particularly pointed out in the appended claims.

In the drawings, Figure 1 is a view in elevation of a coupling that embodies features of the invention applied to a vehicle body or hay rack; Fig. 2 is a plan view of the coupling; and Fig. 3 is a view in rear elevation.

As herein shown in preferred form, a pair of transverse members 1, have a series of bolt openings 2 or the like at each end whereby angle brackets 3 may be adjustably secured so that their upright members may be in turn bolted to the longitudinal sills of a vehicle or the like.

A draft bar 6 is arranged to travel between the underside of the transverse members 1 and applied guide bars 7 that are secured thereto in spaced relation as by separating blocks 8 or the like and suitable holding bolts 9. The inner end portion of the member 6 has a longitudinal guide slot 10 through which a bolt 11 passes in such a way as to prevent sidewise movement of the coupling bar on the innermost transverse member. Guide pulleys 12 and 13 disposed in pairs on the upper and lower sides of the draft member 6 are arranged to bear against the opposite margins of the outer transverse member 2 and thereby guide the tongue or draft member so that it swings back and forward across the frame as occasion requires, with a peculiar motion which insures the proper tracking of any loader or the like that is coupled thereto as by means of a bail 14, clevis or the like.

When trailing the empty loader along a road or removing it from a field, bolts 15 are placed in the member 1, adjacent the pulleys 12 and 13, to prevent it from shifting when going down hill or over ruts; the bolts being removed when the coupling bar is to freely work.

As a result of this construction a coupling or draft rigging is obtained that is readily applied to any hay rack, vehicle or the like, that holds the following implement, such as a hay loader in good alinement with the body and that does not depend for its maintenance upon a single king bolt or pin, but does transmit the load directly to the sills through the guide rolls of the draft bar. There is no adjustment of the device necessary after it is once assembled, and it affords a simple and reliable means for the purposes described.

Obviously, changes in the details of construction may be made without departing from the spirit of my invention and I do not care to limit myself to any particular form or arrangement of parts.

What I claim is:—

1. A coupling for farm machinery comprising a pair of transverse members secured in parallel spaced relation, pairs of oppositely disposed angle brackets adjustably secured on the transverse members, a draft bar having a longitudinally slotted portion engaged by a pin on one transverse member and pairs of guide rollers near the other end of the draft bar between which the other transverse member lies.

2. A coupling for farm machinery comprising a pair of transverse members secured in parallel spaced relation, pairs of oppositely disposed angle brackets adjustably secured on the transverse members, a draft bar having a longitudinally slotted portion engaged by a pin on one transverse member, pairs of rollers on the draft bar embracing the other transverse member, and guide bars secured against the faces of the transverse members and adapted to coöperate therewith in maintaining the draft bar in position.

3. The combination with a wagon rack having longitudinal sills, of a draft rigging including a pair of transverse members secured in spaced relation by longitudinal members, pairs of brackets on the transverse members secured to the sills, guide members on the transverse members, a draft bar playing between the guide and transverse members, a pin on one transverse member engaging a longitudinal slot in the draft bar, and guide rollers on the draft bar embracing the other transverse member.

4. A coupling for farm machinery comprising a pair of transverse members, longitudinally disposed members secured to the transverse members, pairs of holding brackets adjustable on the transverse members, guide members secured on the lower faces of the transverse members in parallel, spaced relation thereto, a draft bar playing between the guide and transverse members, a pin on one transverse member engaging a longitudinal slot in the rear portion of the draft bar and pairs of rollers on the draft bar bearing on the marginal faces of the other transverse member and companion guide.

5. A coupling for farm machinery comprising a pair of transverse members, longitudinally disposed members secured to the transverse members, pairs of oppositely disposed angle brackets adjustably secured on the transverse members, guide members in parallel, spaced relation to the transverse members, a pin on one transverse member, a draft bar playing between the guide and transverse members and having a longitudinal slot engaged by the pin and bearing rollers on the draft bar bearing against the marginal faces of the other transverse member and companion guide.

In testimony whereof I affix my signature in presence of two witnesses.

THORBURN D. McDONALD.

Witnesses:
CORA SIMPSON,
E. C. AWREY.

Copies of this patent may be obtained for five cents each, by addressing the "Commissioner of Patents, Washington, D. C."